United States Patent [19]

Bennion et al.

[11] 3,844,837

[45] Oct. 29, 1974

[54] NONAQUEOUS BATTERY

[75] Inventors: Douglas N. Bennion, Sepulveda, Calif.; John S. Dunning, Sterling Heights, Mich.; William H. Tiedemann, Cedarburg, Wis.; Limin Hsueh, Lexington, Mass.

[73] Assignee: The United States of America as represented by the Secretary of the Navy, Washington, D.C.

[22] Filed: July 7, 1972

[21] Appl. No.: 269,902

[52] U.S. Cl............................... 136/6 LN, 136/122
[51] Int. Cl. ......................................... H01m 35/02
[58] Field of Search .................. 136/6 LN, 100, 122

[56] References Cited
UNITED STATES PATENTS

| | | | |
|---|---|---|---|
| 3,423,242 | 1/1969 | Meyers et al...................... | 136/6 LN |
| 3,484,296 | 12/1969 | Brizzelli .......................... | 136/100 R |
| 3,542,602 | 11/1970 | Gabano........................... | 136/100 R |
| 3,578,500 | 5/1971 | Maricle et al................ | 136/100 R X |
| 3,658,592 | 4/1972 | Dey .................................. | 136/6 LN |

*Primary Examiner*—Winston A. Douglas
*Assistant Examiner*—C. F. Lefevour
*Attorney, Agent, or Firm*—R. S. Sciascia; Roy Miller; Lloyd E. K. Pohl

[57] ABSTRACT

Batteries in which the cathodes are electronically conducting lamellar compounds of graphite are described. Fabrication is carried out by preparing a discharged battery having a reinforced pyrolytic graphite cathode, a nonwoven polypropylene cloth separator, an anode substrate and an electrolyte solution of a suitable lithium salt in either dimethyl sulfite or propylene carbonate between the cathode and anode and then charging the battery to cause an electronically conducting lamellar compound of graphite to be formed as the cathode and lithium to be precipitated as the anode on the anode substrate.

5 Claims, No Drawings

NONAQUEOUS BATTERY

BACKGROUND OF THE INVENTION

1. Field of the Invention

This invention relates to nonaqueous batteries. More particularly, this invention relates to nonaqueous batteries having positive electrodes of electronically conducting lamellar compounds of graphite.

2. Description of the Prior Art

Room temperature, nonaqueous, high voltage cells have failed to become economically useful devices either because they are subject to chemical shorting, i.e., the oxidizing agent in the cathode is too soluble and diffuses to the negative discharging the cell internally, or because there is no viable transfer mechanism to allow for rapid enough discharge. While certain compounds of graphite such as graphite oxide have been suggested for use as depolarizers for primary batteries using aqueous electrolyte solutions, this suggestion has never been seriously pursued.

SUMMARY OF THE INVENTION

A series of organic solvent-lithium salt systems were investigated resulting in the discovery of an electrode system having high voltage on open circuit, modest power density and high energy density. Among the key features of this invention is the use of an electronically conducting graphite electrode positive which has a large surface area. It has been found that pyrolytic graphite, with its very nearly perfect lamellar crystal structure performs better than other forms of very pure carbon. The best performing electrolyte solution is $LiClO_4$ dissolved in dimethyl sulfite (DMSU). Other salts such as $LiCF_3SO_3$ and $LiBF_4$ dissolved in dimethyl sulfite have also been found to perform well as electrolytes. It has further been found that $LiClO_4$ dissolved in propylene carbonate (PC) produces nearly the same electrolyte behavior as the $LiClO_4$ — dimethyl sulfite solution. The negative electrode substrate may be lithium metal or a base material such as copper, aluminum, stainless steel, nickel or graphite upon which lithium metal is deposited.

The negative electrode may be porous, with high internal surface area, or it may be in the form of a wire, screen or sheet.

DESCRIPTION OF THE PREFERRED EMBODIMENTS

EXAMPLE 1

A two compartment cell, compartments separated by a medium glass frit, was filled with a dimethyl sulfite (DMSU) solution saturated with LiF, $LiPF_6$, and $LiClO_4$. The positive electrode was a Pt cup filled with a mixture of approximately 50 percent by volume powdered graphite and 50 percent by volume powdered $K_2SO_4$. The cup had a volume of about 0.5 cm$^3$. The negative electrode was a strip of Al. The electrodes were about 1 cm apart and separated by the glass frit which was 1 cm in diameter and 1 mm thick.

A numer of charging attempts were made at 200 to 400$\mu$A for periods of 10 to 20 minutes. The open circuit potential was about 4.0 volts, but not steady, following these charge periods. Currents of 200$\mu$A could be drawn from the cell at between 3.0 and 2.5 V.

These experiments led to further investigation directed toward the discovery of more promising positive electrode materials. The observation of such a high potential suggested more study of the system. It was concluded that the $K_2SO_4$ probably was not being converted to $K_2S_2O_8$ at any appreciable rate but that some other reaction yielded the high potential. The graphite used in the Pt cup was traced and found to be some scrap left over from building a nuclear reactor.

EXAMPLE 2

A cell was constructed using the system Cu/LiCF$_3$SO$_3$ — DMSU/Graphite. Chips of Li$_2$O impregnated activated charcoal were pressed into holes drilled in the graphite. The graphite was grade R-1 Great Lakes Carbon Co. Nuclear Graphite. The electrodes were plates held by Teflon nuts and bolts and separated by small Teflon washers through which the bolts passed. A test of the cell was performed in a dry nitrogen atmosphere glove box. A constant current of 5mA was passed with copper as the cathode. The overall electrode area was 4 cm$^2$. A deposit of gray metal (assumed to be lithium) was observed on the copper. An open circuit potential of 3.9 V was observed and a 5mA discharge was obtained at about 2.2 V. When 50mA charge currents were used, a flat charging voltage plateau at 6.55 V was observed with no bubbling present at either electrode. Discharges at 5mA showed two voltage plateaus, at 4.25 volts and 2.5 volts. A summary of the series of constant current charges and discharges run is shown in the Table. After the tests were run, the electrodes were removed from the small glass cell and from the dry box. The copper based electrode bubbled vigorously when placed in water, indicating the presence of lithium. The graphite electrode seemed to be pitted and somewhat flaky on the surface but was otherwise intact.

The activated charcoal had been impregnated with LiOH and then heated to 1,000° C. in vacuum. Later experiments indicated that under these conditions most of the LiOH was simply vaporized and probably very little LiOH was converted to Li$_2$O.

TABLE

PERFORMANCE DATA FOR A 4cm$^2$ Li(Cu)LiCF$_3$SO$_3$ - DMSU/GRAPHITE CELL

| CYCLE NO. | CHG TIME (min) | CHG CURRENT (mA) | OPEN CIRCUIT VOLTAGE | DISCHG CURRENT (mA) | DISCHG TIME (min) | COUL EFF. (%) | MIDPOINT VOLTAGE CHG | MIDPOINT VOLTAGE DIS |
|---|---|---|---|---|---|---|---|---|
| 1 | 4.53 | 50 | 4.65 | 5 | 18.3 | 40.6 | 6.55 | 2.75 |
| 2 | 2.66 | 50 | 4.60 | 5 | 11.2 | 42.2 | 6.55 | 2.75 |
| 3 | 2.07 | 50 | 4.60 | 10 | 4.92 | 47.6 | 6.55 | 2.75 |
| 4 | 6.89 | 50 | 4.70 | 50 | 2.56 | 37.1 | 6.55 | 2.75 |
| 5 | 3.74 | 20 | 4.60 | 20 | 5.26 | 68.5 | 5.45 | 3.75 |
| 6 | 12.30 | 20 | 4.70 | 20 | 6.70 | 54.4 | 5.45 | 3.75 |

TABLE—Continued

PERFORMANCE DATA FOR A 4cm² Li(Cu)LiCF₃SO₃ - DMSU/GRAPHITE CELL

| CYCLE NO. | CHG TIME (min) | CHG CURRENT (mA) | OPEN CIRCUIT VOLTAGE | DISCHG CURRENT (mA) | DISCHG TIME (min) | COUL EFF. (%) | MIDPOINT VOLTAGE CHG | MIDPOINT VOLTAGE DIS |
|---|---|---|---|---|---|---|---|---|
| 7 | 14.20 | 20 | 4.70 | 20 | 6.90 | 48.6 | 5.45 | 3.75 |
| 8 | 5.09 | 30 | 4.65 | 30 | 2.76 | 54.3 | 5.85 | 3.35 |
| 9 | 25.40 | 10 | 4.70 | 10 | 14.0 | 55.0 | 5.10 | 4.10 |
| — | — | 5 | — | — | — | — | 4.85 | 4.25 |

EXAMPLE 3

A galvanostatic polarization curve was obtained for each electrode in the system Li/DMSU, LiCF₃SO₃/-Graphite. A strip of copper was used as the substrate on which to deposit lithium. The graphite was grade R-1 Great Lakes Carbon Co. Nuclear Graphite. The concentration of $LiCF_3SO_3$ in DMSU was 1.4 molar at 25° C. The lithium salt was prepared from $Ba(CF_3SO_3)_2$ and was recrystallized twice from acetone. An Ag/AgClO₄ reference electrode was used to measure the potential of each electrode. The graphite electrode showed a greater degree of poarlization than the lithium electrode for a given current density. The deposit of lithium on copper appeared to be adherent. The open circuit potential between the lithium and graphite was measured at the end of each polarization setting and found to be constant at 4.8 V.

The slope of the $\eta$ vs. log $i$ curve for lithium deposition was 115 mV corresponding to a one electron transfer, as expected. The slope for graphite polarization was 100 mV.

These experiments were done in a nitrogen atmosphere dry box with no recirculation provision. A basket of molecular sieves were in the box to trap moisture. No visible nitride or oxide formation was observed on the lithium immersed in the solution during the few hours taken to run the experiment. The cell container used was an open beaker.

EXAMPLE 4

A series of single cells were tested to determine if the previously observed high voltage cells could be duplicated in different solvent-electrolyte systems. All tests were done using as-received reagent grade chemicals. Lithium ribbon negative and nuclear reactor grade graphite positive electrodes were used. These tests were done in a dry argon atmosphere glove box. The results of the tests were as follows:

A. LiClO₄ — Propylene Carbonate

This electrolyte gave very similar behavior to that observed with LiClO₄ — DMSU. Flat charge and discharge voltage-time curves were obtained at constant currents. Open circuit voltages of 4.5 volts and above were observed and a 1mA/cm² discharge above 4.4 volts was obtained for a one hour period. Flash currents of nearly 60 mA/cm² were obtained.

B. LiNO₃ — Propylene Carbonate

This system gave a cell clearly inferior to the previous system. Open circuits after charging were below 4.0 volts and declined rather rapidly with time. A 1mA/cm² discharge for only 4 minutes drove the cell voltage to below 2.0 volts.

C. LiSCN — DMSU

This solution appears to attack lithium metal and turn it black. Open circuits of 2.85 volts were observed after charging. Discharge voltages at 2mA/cm² dropped to 2.0 volts in only 5 minutes.

D. LiClO₁₀₄-n-nitrosodimethyl amine

A very flat charge curve at about 4.5 volts was obtained at 4mA/cm². The open circuit voltage was less than 3.9 volts and discharge voltages at 2mA/cm² dropped below 2.0 volts within 5 minutes.

E. LiNO₃ — DMSU

The behavior of this electrolyte was very similar to the LiNO₃ — propylene carbonate cell. No high voltage cell was observed.

F. LiBF₄ — DMSU

This system has been observed to yield the high voltage produce in the same manner as the LiClO₄ — DMSU system. Open circuit voltages of 4.5 volts have been obtained, but extended charge and discharge tests have been hampered by lithium dendrite formation.

G. A series of salts were tested for gross solubility in DMSU.

If soluble, such salts would have been tested as battery cell electrolytes in a manner similar to the above (A-F) tests. The salts found to be insoluble to any large extent are $LiBO_2$, $Li_2CO_3$, LiCl, $Li_2SiO_3$, $LiPO_3$, $Li_2SO_4$, $Li_2O$ and $Li_2O_2$. While these salts may be useful in electrodes of other types, their insolubility in DMSU precludes their use in batteries such as those under consideration here using DMSU as the solvent.

The above tests show some guidelines to the prediction of whether a given electrolyte-solvent system will form the lithium-graphite high voltage electrochemical cell. The criteria may be summarized as follows:

1. The electrolyte salt must be soluble in the solvent.

2. The solvent must be stable at high positive potentials with respect to a lithium electrode. The solvents dimethyl sulfoxide and n-nitrosodimethyl amine apparently decompose at such potentials and are, therefore, not suitable. The solvents DMSU and propylene carbonate are sufficiently stable to be useful.

3. The electrolyte salt must be stable at high positive potentials with respect to lithium. The salts LiNO₃ and LiSCN apparently fail in this respect while LiClO₄ and LiBF₄ are apparently suitable.

4. Useful batteries are possible only if the conductance of the electrolyte solution is reasonably high. The conductance of a solution of 1.64 moles of LiClO₄ per Kg of DMSU was found to be $5.72 \times 10^{-3}$ mhl/cm which is sufficiently high.

EXAMPLE 5

Single cell charge and discharge tests were done on a Li/LiClO₄ (sat.) DMSU/graphite cloth cell. The tests were done in an argon filled glove box in a test cell with electrode area of 5 cm².

It was found that a high voltage product was formed. The charge-discharge curves were not as flat as those of previous tests. Coulombic efficiencies for four runs were 68 percent, 77 percent, 66 percent and 59 percent for 20 minute charge times at 2mA/cm$^2$. It was found that the typical open circuit after charge was between 4.5 and 5 volts and that most of the discharge at constant current of 2mA/cm$^2$ was above 3.5 volts cell potential.

At the time of the tests, it was felt that one reason for the fairly low capacity of the cell was that the graphite cloth was not completely graphitized by the manufacturer. Additional annealing above 3,000° C. was accomplished in a vacuum furnace powered by induction coils. Tests on samples of graphite cloth which had been subjected to this treatment for four hours showed no significant improvement over the as-received cloth. It was concluded that either the cloth cannot be completely graphitized or that the capacity of the graphite for charge retention is fairly low (about 60 coul/gm).

EXAMPLE 6

Early tests in LiClO$_4$ — DMSU systems used graphite electrodes obtained from scrap pieces of Great Lakes Carbon Company grade R-1 graphite used in a nuclear reactor. (These scrap pieces had not been subjected to radiation.) It was found that these electrodes tended to disintegrate as charging took place, although not an extent sufficient to cause complete cell failure. A more durable and perhaps more porous form of graphite was sought.

A material described in the Super Temp Engineering Handbook of Pyrolytic Materials as RPG (Reinforced Pyrolytic Graphite) was tried. RPG is formed by impregnating a carbon felt with pyrolytic carbon deposited from methane at 1,850° to 2,050° F. It is possible to control the porosity of the final product by impregnating for longer or shorter periods of time. The pyrolytic carbon is then converted to graphite at 3,000° C.

A sample of RPG of density 1.70 gm/cc was cut into an electrode form with 5 cm$^2$ area. It was then washed in a Soxhlet extractor with acetone. After drying, the electrode was placed into a dry argon atmosphere glove box and assembled into a test cell with a lithium negative electrode and saturated LiClO$_4$ in DMSU electrolyte. A battery test was performed on this system. A series of 20 minute charge-discharge voltage-time plots were recorded for currents of 2mA/cm$^2$. The curves were quite flat both on charge and discharge. Each discharge was carried to a sharp break in the voltage-time curve which occurred near 3.8 volts. Open circuits were approximately 4.4 volts with the majority of the discharge above 4.0 volts. Charging voltages were approximately 4.6 volts. Coulombic efficiencies for the cell increased as the number of cycles increased. For the first eight cycles the efficiencies were 56 percent, 73 percent, 87 percent, 87 percent, 89 percent 85 percent, 95 percent, and 90 percent.

After a 17.5 hour charge at 1mA/cm$^2$, the open circuit voltage was 4.55 volts and quite stable. A discharge of 2mA/cm$^2$ was carried out at 4.4 volts for 10 minutes. Then a 10mA/cm$^2$ discharge was carried out for a 30 minute period.

During this discharge the voltage dropped from 4.0 volts to 2.5 volts. Open circuit voltage returned quickly to 4.3 volts stable for 3 hours. A 2mA/cm$^2$ discharge for 30 minutes was carried out above 3.5 volts. Flash currents of 70mA/cm$^2$ were observed.

It was observed that the solution in the glass cell remained clear throughout the tests, with small crystals of LiClO$_4$ present in the bottom of the cell. No bubbling was observed on the graphite electrode.

The RPG remained intact and did not disintegrate throughout the experiment and thus appeared to have an advantage over the nuclear reactor graphite in terms of structural stability as well as performance.

Later, this same piece of RPG was put back into a cell and three cycles covering several days were realized. The final cycle was an 11 hour charge at 5mA(~1mA cm$^2$) followed by a 4 hour discharge at 10mA(~2mA/cm$^2$) to a cutoff voltage of 3.5 V.

EXAMPLE 7

A cell was assembled using an RPG positive electrode 4.47 cm × 1.83 cm × 0.113 cm. It was suspended in a glass cell (6.4 cm × 3.9 cm × 0.7 cm) by a fine Pt wire. Strips of Al 6.4 cm × 2.0 cm × 0.0125 cm were placed on either side of the RPG. Nonwoven polypropylene cloth 0.0076 cm thick (Kendall Corp., Grade No. E1451) was used as a separator. The cell was filled with DMSU and a large excess of LiClO$_4$. The DMSU had been vacuum distilled after contacting with chromatographic grade Linde 5A molecular sieves. Only material with conductivity less than 10$^{-8}$ mho/cm (about 80 percent middle cut) was retained. Water content by Carl Fischer titration was less than 50 ppm. The LiClO$_4$ had been recrystallized from acetone and chloroform and vacuum dried.

The cell was cycled 33 times, 1 hour charge and 1 hour discharge. The charge was at 34mA, the discharge at 8mA. Typical charge voltage was 4.85V and typical discharge voltage 4.5V.

On disassembly, the RPG electrode was swollen but was still approximately rectangular with dimensions 5.7 cm × 2.7 cm × 0.104 cm. By comparison to original dimensions the overall or superficial volume changed from 0.923 cm$^3$ to 1.601 cm$^3$ or an increase of 74 percent. The RPG was still very porous to water.

EXAMPLE 8

A cell was built with two pieces of RPG (4.67 cm × 1.82 cm × 0.0915 cm) placed opposite each other in a narrow cell. Polypropylene nonwoven cloth was used as a separator. A sheet of aluminum (5.7 cm × 2.12 cm × 0.0173 cm) was put on the other side of the central (positive) RPG electrode. The electrolyte was DMSU saturated with excess LiClO$_4$. The cell was open and inside the dry box described above which had no recirculation of gas.

The first 19 cycles were between the two RPG electrodes. Charging was 1 hour at 16mA(~2.8mA/cm$^2$) followed by discharge through 240 ohms. The discharge was above 15mA for 45 minutes when the potential fell below 3.5V. The coulombic efficiency was between 70 percent and 80 percent. The 20th and 21st cycles were operated at 30mA charge (~5.3mA/cm$^2$) for 1 hour followed by discharge through a 120 ohm resistor. The cell potential was very similar to that described in Example 6. The geometric area was about 5.65 cm$^2$.

The RPG negative always ran a little positive of a lithium wire reference electrode as measured with a Hewlett-Packard Model 3440A digital voltmeter or a Keithly Model 610B electrometer.

The RPG negative showed almost no physical change while the positive was slightly warped such that the edges were further away from the negative.

EXAMPLE 9

Other tests, similar to those described in Examples 1 through 8, confirmed that $LiCF_3SO_3$ or $LiBF_4$ dissolved in either DMSU or propylene carbonate perform well as electrolyte solutions. These tests further revealed that nickel or stainless steel could be used as a negative electrode substrate in lieu of the copper, lithium, aluminum and RPG mentioned above and that the negative electrode substrate could be in the form of a wire, screen or sheet. Nonaqueous batteries constructed from the materials described herein may be either primary or secondary.

What is claimed is:

1. A nonaqueous battery comprising,
   a. an electronically conducting cathode formed by reacting pyrolytic graphite with a salt selected from the group consisting of $LiClO_4$, $LiCF_3SO_3$ and $LiBF_4$ to form a compound of pyrolytic graphite and the negative ion of said salt;
   b. a lithium anode; and
   c. an electrolyte solution made up by dissolving a salt selected from the group consisting of $LiClO_4$, $LiCF_3SO_3$, and $LiBF_4$ in a solvent selected from the group consisting of dimethyl sulfite and propylene carbonate.

2. A battery according to claim 1 wherein said cathode is formed by the reaction of $LiClO_4$ with graphite.

3. A battery according to claim 1 wherein said cathode is formed by the reaction of $LiCF_3SO_3$ with graphite.

4. A battery according to claim 1 wherein said cathode is formed by the reaction of $LiBF_4$ with graphite.

5. A method for fabricating a battery of the type described in claim 1, said method comprising the steps of:
   a. preparing a discharged battery having a pyrolytic graphite cathode, a nonwoven polypropylene cloth separator, an anode substrate selected from the group consisting of lithium metal, copper metal, aluminum metal, nickel metal, stainless steel and graphite and an electrolyte solution made up of a salt selected from the group consisting of $LiCF_3SO_3$, $LiClO_4$ and $LiBF_4$ dissolved in a solvent selected from the group consisting of dimethyl sulfite and propylene carbonate; and
   b. charging said battery to cause a reaction wherein an electronically conducting lamellar compound of graphite and the negative ion of said salt is formed as the cathode and Li is deposited on said anode substrate.

* * * * *